(12) United States Patent
Hu et al.

(10) Patent No.: US 10,830,964 B2
(45) Date of Patent: Nov. 10, 2020

(54) OPTICAL FIBER CONNECTOR

(71) Applicant: ROSENBERGER(SHANGHAI) TECHNOLOGY CO., LTD, Shanghai (CN)

(72) Inventors: Mingzhen Hu, Shanghai (CN); Daigen Chen, Shanghai (CN)

(73) Assignee: ROSENBERGER(SHANGHAI) TECHNOLOGY CO., LTD., Shanghai (CN)

(*) Notice: Subject to any disclaimer, the term of this patent is extended or adjusted under 35 U.S.C. 154(b) by 69 days.

(21) Appl. No.: 16/369,602

(22) Filed: Mar. 29, 2019

(65) Prior Publication Data
US 2019/0369335 A1 Dec. 5, 2019

Related U.S. Application Data

(63) Continuation of application No. PCT/CN2018/089943, filed on Jun. 5, 2018.

(51) Int. Cl.
G02B 6/38 (2006.01)

(52) U.S. Cl.
CPC ........... G02B 6/387 (2013.01); G02B 6/3825 (2013.01); G02B 6/3849 (2013.01); G02B 6/3879 (2013.01); G02B 6/3893 (2013.01)

(58) Field of Classification Search
CPC .... G02B 6/387; G02B 6/3825; G02B 6/3849; G02B 6/3879; G02B 6/3893; G02B 6/3885; G02B 6/3821
See application file for complete search history.

(56) References Cited

U.S. PATENT DOCUMENTS

| 8,764,313 B2* | 7/2014 | Arishima | G02B 6/3893 385/78 |
| 8,944,838 B2* | 2/2015 | Mulfinger | G02B 6/3893 439/352 |
| 9,477,049 B2* | 10/2016 | Gniadek | H01R 13/625 |
| 9,507,103 B2* | 11/2016 | Wu | G02B 6/3887 |

FOREIGN PATENT DOCUMENTS

| CN | 103606783 A | 2/2014 |
| CN | 204575902 U | 8/2015 |
| CN | 105988165 A | 10/2016 |
| WO | 2011022728 A1 | 2/2011 |

OTHER PUBLICATIONS

State Intellectual Property Office of the P.R. China (ISR/CN), "International Search Report for PCT/CN2018/089943", China, dated Jan. 30, 2019.

* cited by examiner

Primary Examiner — John Bedtelyon
(74) Attorney, Agent, or Firm — Locke Lord LLP; Tim Tingkang Xia, Esq.

(57) ABSTRACT

The present invention discloses an optical fiber connector, which comprises a first shell, a second shell and an unlocking shell, wherein the first shell and the second shell are mutually inserted, the first shell and the second shell are locked and unlocked through the unlocking shell. According to the present invention, an unlocking action of the unlocking shell on the second shell is axially push-pull unlocking, which is realized by the stop structure, the unlocking shell is convenient to mount, and the unlocking is convenient and quick.

10 Claims, 10 Drawing Sheets

OPTICAL FIBER CONNECTOR

CROSS REFERENCE TO RELATED APPLICATIONS

This application is a continuation of International Application No. PCT/CN2018/089943, filed on Jun. 5, 2018. The contents of which is all hereby incorporated by reference.

FIELD OF THE INVENTION

The present invention relates to an optical fiber connector, and more particularly, to an optical fiber connector that can be quickly and conveniently unlocked.

BACKGROUND

An optical fiber connector can butt optical fibers in sections. For example, data processing equipment or communication equipment is connected to a signal source through an optical fiber cable, and the optical fiber connector acts as a medium between them. The optical fiber connector generally includes an optical fiber plug and a socket that can be butted with each other, in order to maintain stable connection during butt joint, traditional outdoor multi-core optical fibers are usually connected by screwing. However, for externally threaded optical fiber connector, manual screwing space needs to be reserved during mounting, the size is large, the operation is complicated, and threaded connection has a negative impact on sensitive optical connection products.

SUMMARY OF THE INVENTION

The present invention is intended to overcome the defects of the prior art and provide an optical fiber connector that can be conveniently and quickly unlocked.

In order to achieve the above object, the present invention provides the following technical solution: an optical fiber connector comprises:

a first shell comprising a clamping portion;

a second shell comprising an elastic buckling portion matched with the clamping portion, wherein an end surface of the elastic buckling portion is formed with a first unlocking surface; and an unlocking shell movably limited on the second shell through a stop structure, wherein the unlocking shell comprises a second unlocking surface;

wherein in the process that the first shell is inserted into the second shell, the clamping portion forces the elastic buckling portion to expand outwardly and clamp one side of the clamping portion; and in the process that the unlocking shell is axially pulled away from the first shell, the second unlocking surface is contacted with the first unlocking surface located at the end surface of the elastic buckling portion, thereby forcing the elastic buckling portion to expand outwardly to unlock the clamping portion.

Preferably, the stop structure comprises a first stop portion arranged on the second shell and a second stop portion arranged on the unlocking shell and matched with the first stop portion.

Preferably, the second shell further comprises a second shell body, the elastic buckling portion is mounted on the second shell body, and the unlocking shell is movably limited on the elastic buckling portion through the stop structure.

Preferably, one side surface of the first stop portion close to the first shell is an inclined surface.

Preferably, one side surface of the second stop portion close to the second shell is an inclined surface matched with the inclined surface of the first stop portion.

Preferably, the unlocking shell is further mounted on the second shell through an anti-rotation positioning structure.

Preferably, the anti-rotation positioning structure comprises an anti-rotation positioning pin arranged at an end portion of the unlocking shell, and the second shell is provided with a positioning groove into which the anti-rotation positioning pin is inserted.

Preferably, the first shell and the second shell are respectively provided with a position mark, and the first shell is inserted into the second shell when the two position marks are aligned.

Preferably, the optical fiber connector further comprises:

a first multi-core inserted fixing shell comprising a first buckle, wherein the first shell is provided with a first clamping groove corresponding to the first buckle, and the first buckle is inserted into the first clamping groove to position the first multi-core inserted fixing shell in the first shell; and a second multi-core inserted fixing shell comprising a second buckle, wherein the second shell is provided with a second clamping groove corresponding to the second buckle, and the second buckle is inserted into the second clamping groove to position the second multi-core inserted fixing shell in the second shell.

Preferably, the first shell is provided with a sealing ring, and the first shell is hermetically connected to the second shell through the sealing ring.

Preferably, the first shell further comprises a locking groove arranged on one side of the clamping portion and matched with an end portion of the elastic buckling portion.

The present invention has the beneficial effects as follow.

1. The unlocking shell is movably limited on the corresponding shell thereof through the stop structure, and due to the arrangement of the stop structure, the unlocking shell is not easy to fall off from the second shell; and it is different from the connection between the existing unlocking shell and the shell by a threaded structure that, according to the present invention, an unlocking action of the unlocking shell on the shell is axially push-pull unlocking, which is realized by the stop structure instead of the rotation of the unlocking shell, the unlocking shell is convenient to mount, and the unlocking is convenient and quick.

2. The unlocking shell is further mounted on the shell through the anti-rotation positioning structure, and the unlocking shell limited on the second shell can only move axially but cannot rotate radially, thus avoiding the influence of the rotation of the second shell on the stability of an internal optical fiber assembly.

3. The first shell and the second shell are respectively provided with a position mark used for mutual inserting and positioning, which can prevent the optical fiber assembly in the two shells from being damaged by mis-insertion.

REFERENCE NUMERALS

100 refers to first shell, 101 refers to clamping protrusion, 102 refers to locking groove, 103 refers to sealing ring, 104 refers to flange seat, 105 refers to position mark, 106 refers to first clamping groove, 200 refers to second shell, 201 refers to second shell body, 202 refers to elastic buckling portion, 203 refers to external thread, 204 refers to internal thread, 205 refers to connecting portion, 206 refers to claw buckle body, 207 refers to first unlocking surface, 208 refers to position mark, 209 refers to second clamping groove, 300 refers to unlocking shell, 301 refers to second unlocking surface, 400 refers to stop structure, 401 refers to first stop portion, 402 refers to second stop portion, 500 refers to anti-rotation positioning structure, 501 refers to positioning groove, 502 refers to anti-rotation positioning pin, 600 refers to first multi-core inserted fixing shell, 601 refers to first buckle, 700 refers to second multi-core inserted fixing shell, 701 refers to second buckle, and 800 refers to dust cap.

DETAILED DESCRIPTIONS OF THE PREFERRED EMBODIMENTS

The technical solution of the embodiment of the present invention is clearly and completely described hereinafter with reference to the drawings of the present invention.

With reference to FIGS. 1 to 7, an optical fiber connector disclosed by the present invention comprises a first shell 100, a second shell 200, and an unlocking shell 300, the unlocking shell 300 is movably limited on the second shell 200 through a stop structure 400, and due to the arrangement of the stop structure 400, the unlocking shell 300 is not easy to fall off from the second shell 200; and it is different from the connection between the existing unlocking shell 300 and the second shell 200 by a threaded structure that, according to the present invention, an unlocking action of the unlocking shell 300 on the second shell 100 is axially push-pull unlocking, which is realized by the stop structure 400, the unlocking shell 300 is convenient to mount, and the unlocking is convenient and quick. A special elastic member of the second shell 200 ensures that a push-pull unlocking structure is repeatedly inserted and pulled for 150 times without deformation, and the stop structure 400 is prevented from coming out of the second shell 200 through a self-locking stop tongue after interference pressing.

Figure 2:
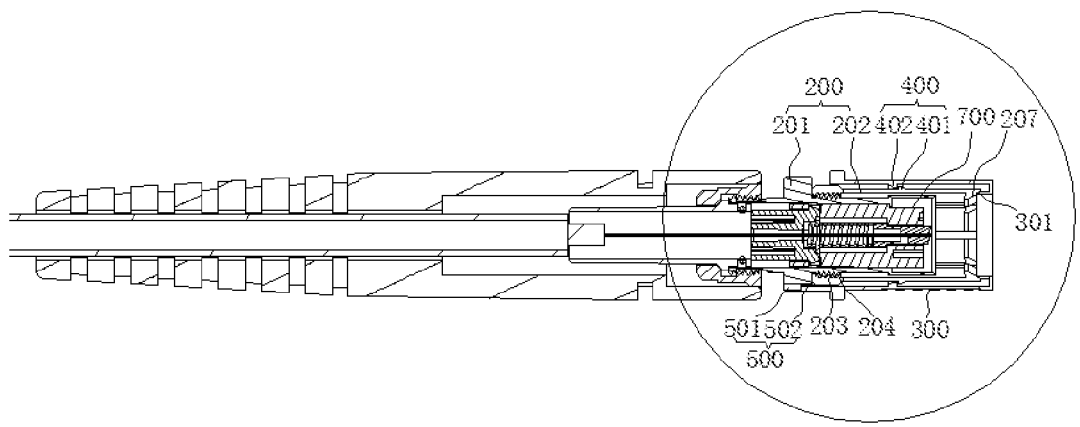
FIG. 2 is a cross-sectional structure diagram of a male connector assembly according to the present invention.
Figure 3:
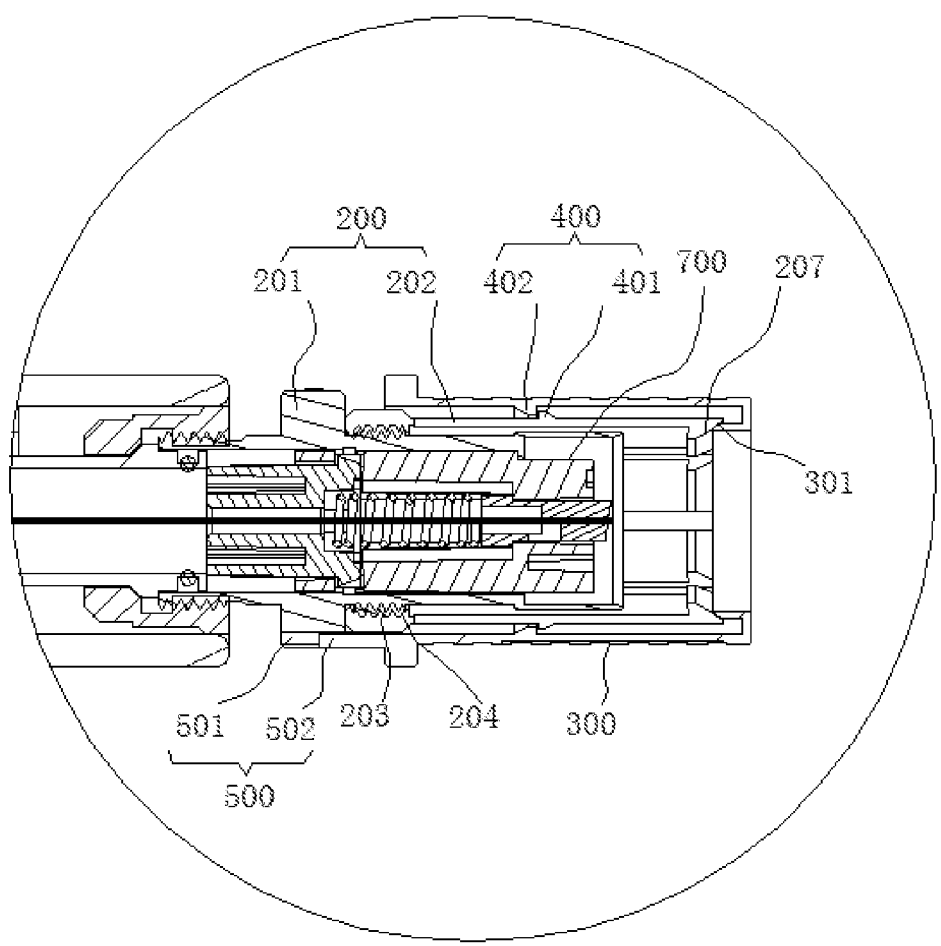
FIG. 3 is a partially enlarged structure diagram of FIG. 2.
Figure 4:
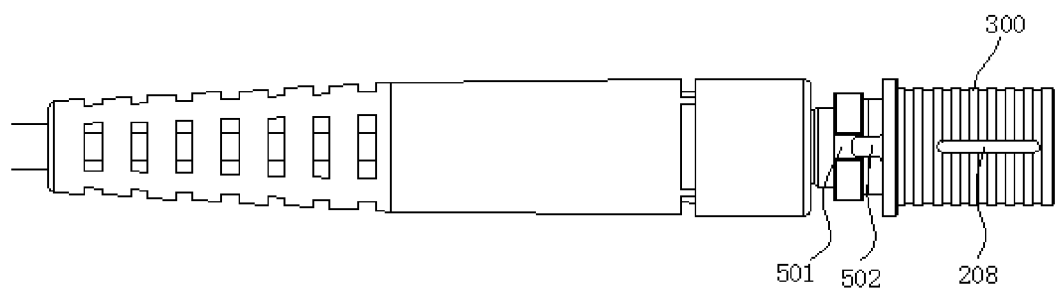
FIG. 4 is a structure diagram of the male connector assembly according to the present invention.
Figure 5:
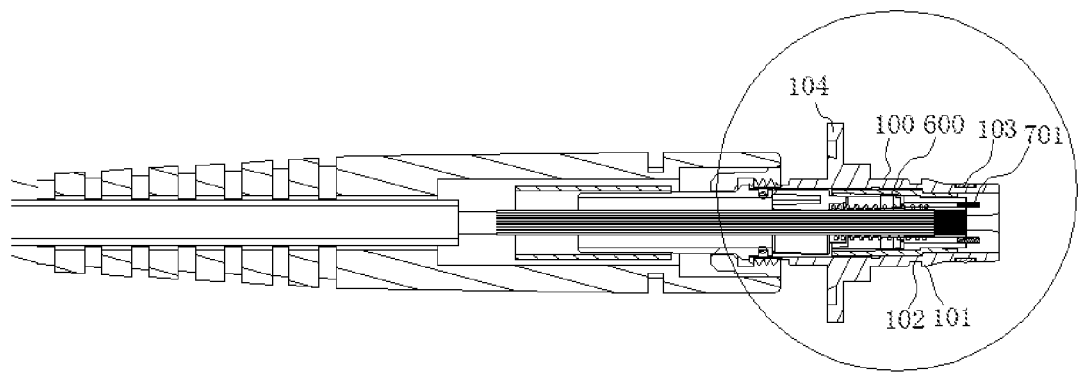
FIG. 5 is a cross-sectional structure diagram of a female connector assembly according to the present invention.
Figure 6:
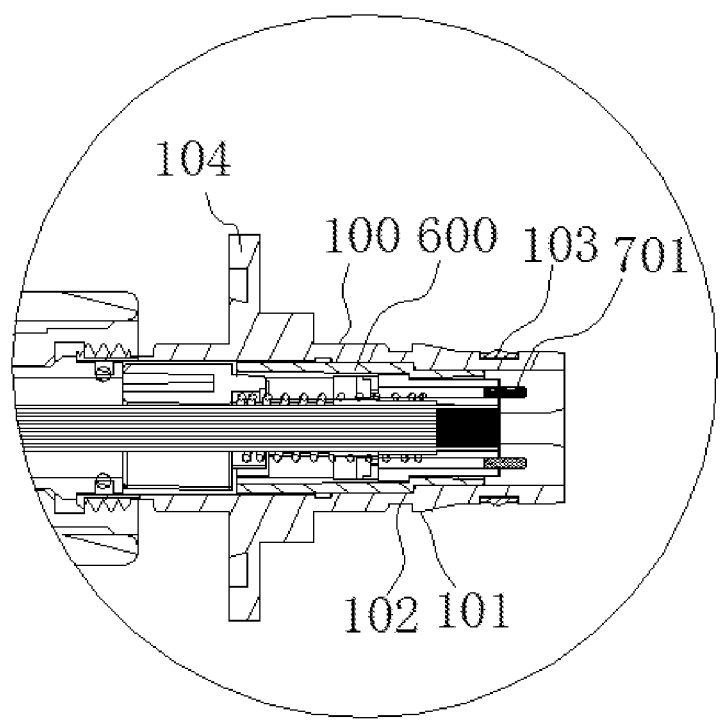
FIG. 6 is a partially enlarged structure diagram of FIG. 5.
Figure 7:
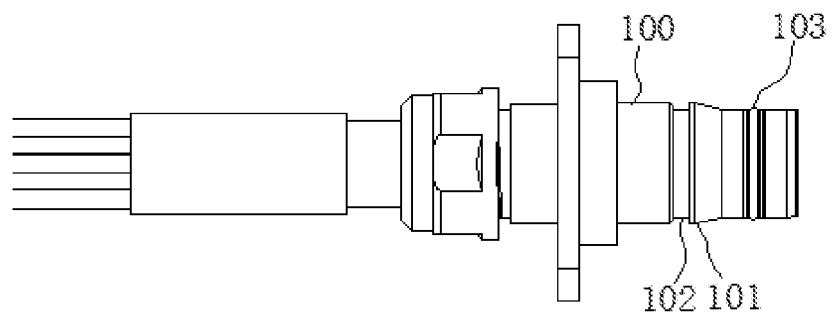
FIG. 7 is a structure diagram of the female connector assembly according to the present invention.

Specifically, the second shell 200 comprises a second shell body 201 and an elastic buckling portion sleeved outside the second shell body 201, in the embodiment, the elastic buckling portion is an elastic claw buckle 202, which is in threaded connection with the second shell body 201, and in the embodiment, as shown in FIG. 2, the second shell body 201 is provided with an external thread 203, and the elastic claw buckle 202 is internally and correspondingly provided with an internal thread 204. Optionally, the elastic claw buckle may also be sleeved outside the second shell body 201 by other fixing methods (such as welding, riveting, etc.).

Figure 10:
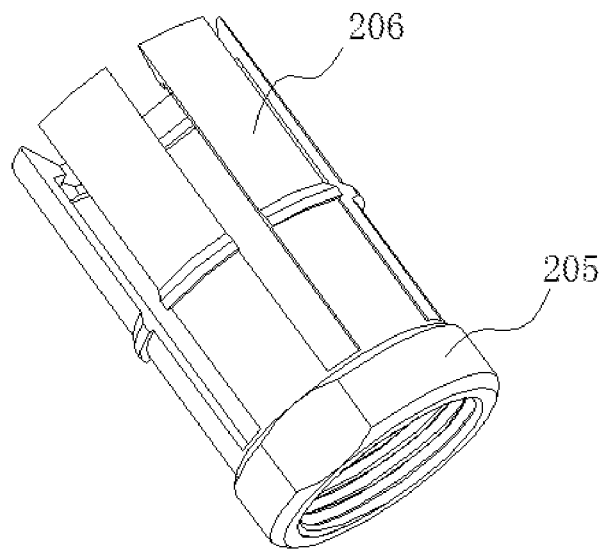
FIG. 10 is a structure diagram of an elastic buckling portion according to the present invention.

With reference to FIGS. 2 and 10, the elastic claw buckle 202 comprises an integrally formed connecting portion 205 and a plurality of claw buckle bodies 206, and the internal thread 204 cooperatively connected to the second shell body 201 is formed in the connecting portion 205; and the claw buckle body 206 is formed by extending outwardly from one side end of the connecting portion 205, a plurality of claw buckle bodies 206 are distributed in the circumferential direction of the connecting portion 205, and a split groove structure is formed between two adjacent claw buckle bodies, so that each claw buckle body has a shrapnel function. In the embodiment, the connecting portion 205 is provided with six claw buckle bodies 206 uniformly distributed in the circumferential direction. The other end surface of each claw buckle body 206 forms a first unlocking surface 207. In the embodiment, the other end portion of the claw buckle body 206 is a hook, an inclined end surface of the hook constitutes the first unlocking surface 207, and in other embodiments, the first unlocking surface 207 may also be directly arranged as an inclined surface.

Figure 1:
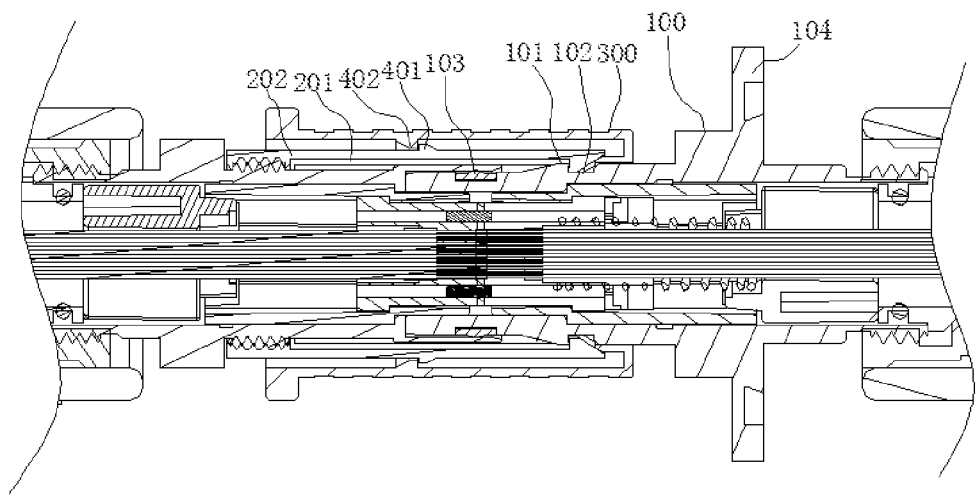
FIG. 1 is a cross-sectional structure diagram of an optical fiber connector according to the present invention.

With reference to FIGS. 1 and 2, the unlocking shell 300 is movably limited on the elastic claw buckle 202 through the stop structure 400, and specifically, in the embodiment, the stop structure 400 comprises a first stop portion 401 and a second stop portion 402 which are matched with each other, wherein the first stop portion 401 is formed by protruding outwardly from an outer surface of the elastic claw buckle 202, and the second stop portion 402 is formed by protruding outwardly from an inner surface of the unlocking shell 300. Preferably, in order to facilitate the mounting of the unlocking shell 200, one side surface of the first stop portion 401 close to the first shell 100 is arranged as an inclined surface, the other side surface is a right angle surface for stopping, and correspondingly, one side surface of the second stop portion 402 close to the second shell 200 is arranged as an inclined surface matched with the inclined surface of the first stop portion 401, thus, when the unlocking shell 300 is mounted, since the claw buckle body 206 is easy to be driven elastically, when the unlocking shell 300 moves along the inclined surface of the first stop portion 401, the claw buckle body 206 may be forced to move slightly inwardly, due to the matching of the inclined surfaces of the two stop portions, the second stop portion 402 on the unlocking shell 300 easily passes over the first stop portion 401 on the elastic claw buckle 202, and due to the matching of the two stop portions 401 and 402, the unlocking shell 300 is not easy to fall off from the elastic claw buckle 202 after being mounted on the elastic claw buckle 202 due to the blocking of the stop portions 401 and 402. As shown in FIG. 2, the end surface of the unlocking shell 300 close to the first shell 100 further forms a second unlocking surface 301, and in the embodiment, the second unlocking surface 301 is an inclined surface matched with the first unlocking surface 207.

The most ideal design scheme is that when the two stop portions 401 and 402 are in abutting positions, the inclined surfaces of the first unlocking surface 207 and the second unlocking surface 301 are in mating contact with each other, so that the unlocking shell 300 cannot move freely in an axial direction, and the unlocking is realized when the unlocking shell 300 and the first shell 200 move between a matching position and a non-matching position. Certainly, as an option, when the two stop portions 401 and 402 are in the abutting positions, the inclined surfaces of the first unlocking surface 207 and the second unlocking surface 301 may also form a gap.

With reference to FIGS. 2 to 4, FIG. 9 and FIG. 11, and preferably, in order to prevent the unlocking shell 300 from rotating radially on the second shell 200, the unlocking shell 300 is further mounted on the second shell 200 through an anti-rotation positioning structure 500. Specifically, in the embodiment, the anti-rotation positioning structure 500 comprises a positioning groove 501 arranged on the second shell body 201 and an anti-rotation positioning pin 502 arranged at the end portion of the unlocking shell 300, and the unlocking shell 300 is inserted into the positioning groove 501 through the anti-rotation positioning pin 502 to realize anti-rotation positioning with the second shell 200. In this way, the unlocking shell 300 can only move axially (i.e., in left and right directions) on the second shell 200 and cannot rotate radially, thus avoiding the influence of the rotation of the second shell 200 on the stability of an internal optical fiber assembly.

Figure 12:
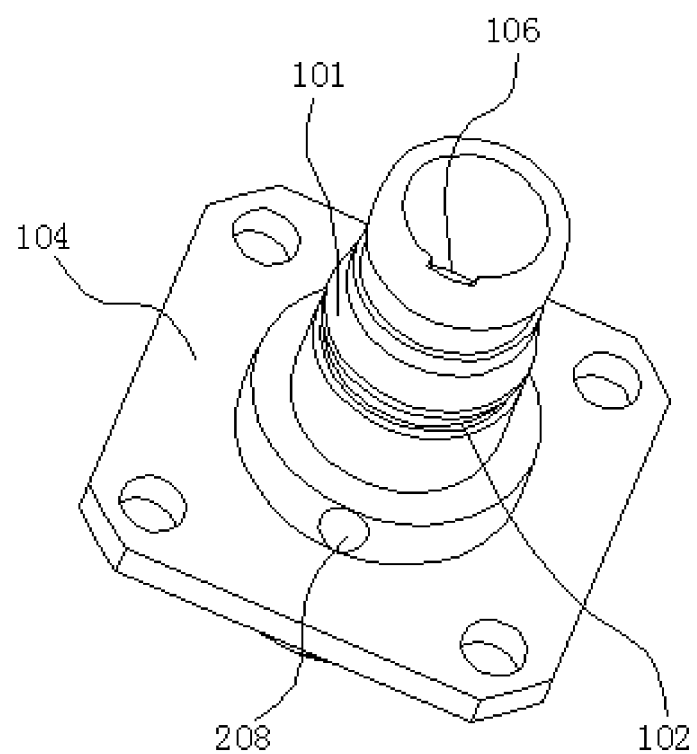
FIG. 12 is a structure diagram of a first shell according to the present invention.

As shown in FIG. 12, the first shell 100 comprises a clamping portion matched with the elastic claw buckle 202, in the embodiment, the clamping portion is a clamping protrusion 101, in the process that the first shell 100 is inserted into the second shell body 201, the clamping protrusion 101 forces the elastic claw buckle 202 to expand outwardly and clamp one side of the clamping protrusion 101, thereby locking the first shell 100 and the second shell 200. In the embodiment, the first shell 100 further comprises a locking groove 102 arranged on one side of the clamping projection 101, and after the first shell 100 is inserted into the second shell body 201, the hook of the elastic claw buckle 202 is clamped into the locking groove 102.

In the process of pushing and pulling the unlocking shell 300 away from the first shell 100, the second unlocking surface 301 thereof is contacted with the first unlocking surface 207 located at the end surface of the elastic claw buckle 202, thereby forcing the elastic claw buckle 202 to expand outwardly, and the hook thereof falls off from the locking groove 102 of the first shell 100 to unlock the locking projection 101, so that the first shell 100 can be pulled out of the second shell 200 to realize unlocking.

Preferably, as shown in FIG. 1, the first shell 100 is further provided with a sealing ring 103, and the first shell 100 is hermetically connected to the second shell 200 through the sealing ring 103. Moreover, the first shell 100 is a shell with a flange seat 104, so that the flange seat 104 of the first shell 100 can be fixed on an outdoor cabinet or equipment with screws (not shown in the drawings).

Figure 11:
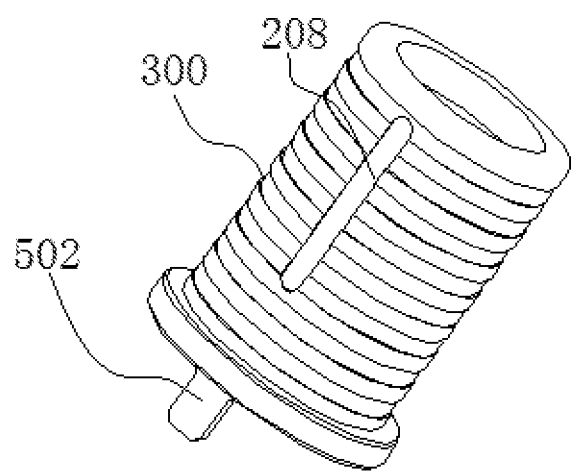
FIG. 11 is a structure diagram of an unlocking shell according to the present invention.

More preferably, as shown in FIG. 11 and FIG. 12, in order to position the insertion of the first shell 100 into the second shell 200 and prevent the optical fiber assemblies in the two shells from being damaged by mis-insertion, the embodiment respectively arranges position marks 105 and 208 on the first shell 100 and the unlocking shell 200 for positioning the mutual inserting positions of the two shells 100 and 200, and the first shell 100 is inserted into the second shell 200 when the two position marks 105 and 208 are aligned.

Figure 13:
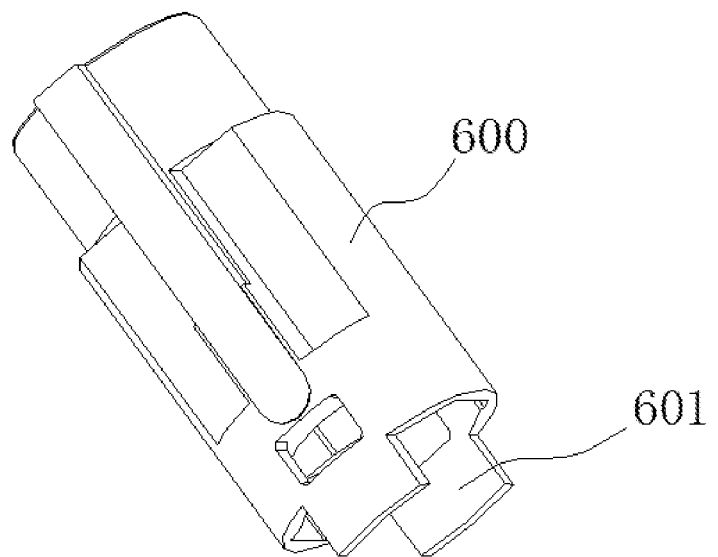
FIG. 13 is a structure diagram of a first multi-core inserted fixing shell according to the present invention.
Figure 15:
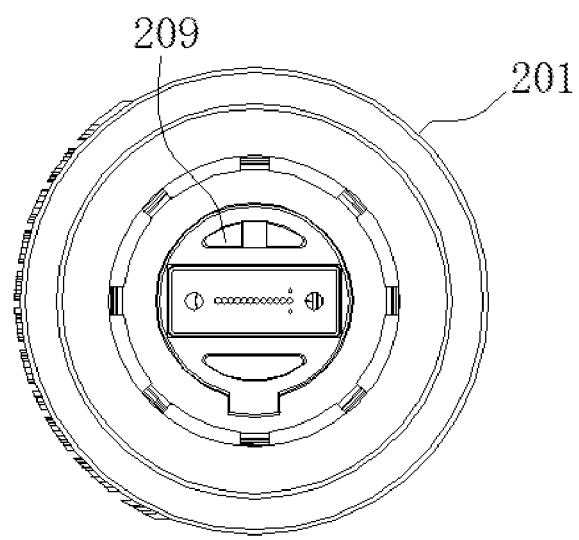
FIG. 15 is a side structure diagram of the second shell body according to the present invention.

Further, the optical fiber connector further comprises: a first multi-core inserted fixing shell 600 and a second multi-core inserted fixing shell 700, wherein, as shown in FIG. 12 and FIG. 13, the first multi-core inserted fixing shell 600 is mounted in the first shell 100, which comprises a first buckle 601, the first shell 100 is provided with a first clamping groove 106 corresponding to the first buckle 601, and the first buckle 601 is inserted into the first clamping groove 106 to position the first multi-core inserted fixing shell 600 in the first shell 100. The second multi-core inserted fixing shell 700 is mounted in the second shell 200, which comprises a second buckle 701, as shown in FIG. 15, the second shell 200 is provided with a second clamping groove 209 corresponding to the second buckle 701, and the second buckle 701 is inserted into the second clamping groove 209 to position the second multi-core inserted fixing shell 700 in the second shell 200. The second multi-core inserted fixing shell 700 and the first multi-core inserted fixing shell 600 have the same structure, which can be seen in FIG. 13. In addition, the structures of the first multi-core inserted fixing shell 600 and the second multi-core inserted fixing shell 700 may be the same, and compared with the condition that the structures of the multi-core inserted fixing shells 600 and 700 in the existing first shell 100 and the second shell 200 are different, the processing procedure and the processing cost are reduced.

Figure 8:
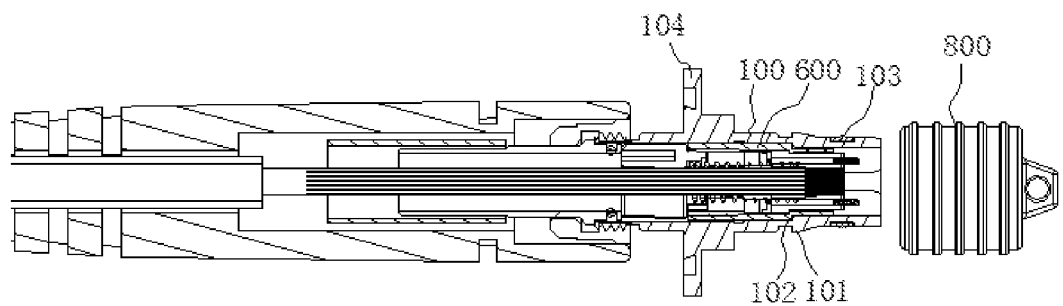
FIG. 8 is a cross-sectional structure diagram of the female connector assembly with a dust cover according to the present invention.
Figure 9:
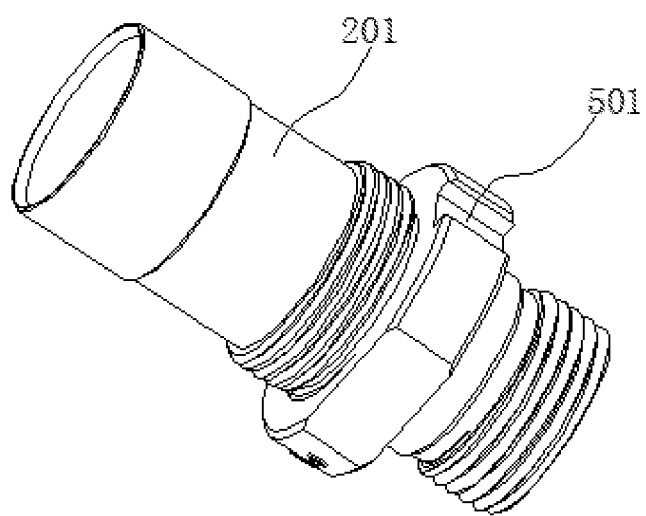
FIG. 9 is a structure diagram of a second shell body according to the present invention.
Figure 14:
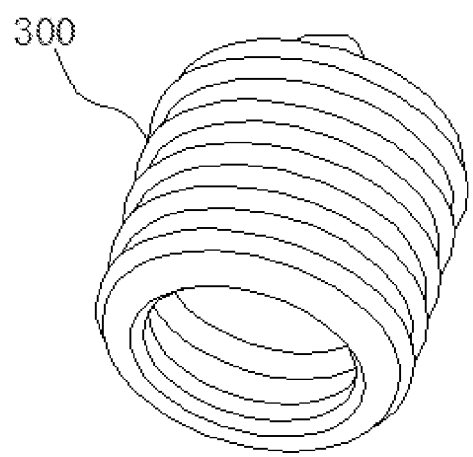
FIG. 14 is a structure diagram of a dust cap according to the present invention.

In addition, the first shell 100 above and the first multi-core inserted fixing shell 600 mounted on one side of the first shell 100 constitute a female connector assembly in the present invention; and the second shell body 201, the elastic claw buckle 202, the unlocking shell 300 mounted on one side of the second shell 200, the second multi-core inserted fixing shell 700, etc. constitute a male connector assembly in the utility model. In addition, as shown in FIG. 8 and FIG. 14, dust caps 800 are respectively sleeved at one end of the female connector assembly and the male connector assembly away from respective tailpipe, the two dust caps 800 are removed during use, and the first shell 100 and the second shell 200 are mutually inserted to realize butt joint of optical fibers.

The technical contents and technical features of the present invention have been disclosed above, but those skilled in the art can still make various replacements and modifications not deviating from the spirit of the present invention based on the instruction and disclosure of the present invention. Therefore, the protection scope of the present invention shall include various replacements and modifications not deviating from the present invention instead of being limited to the contents disclosed by the embodiments, and is covered by the claims of the application of the patent.

The invention claimed is:
1. An optical fiber connector, comprising:
   a first shell comprising a clamping portion;
   a second shell comprising an elastic buckling portion matched with the clamping portion, wherein an end surface of the elastic buckling portion is formed with a first unlocking surface; and
   an unlocking shell movably limited on the second shell through a stop structure, wherein the unlocking shell comprises a second unlocking surface;
   wherein in the process that the first shell is inserted into the second shell, the clamping portion forces the elastic buckling portion to expand outwardly and clamp one side of the clamping portion; and in the process that the unlocking shell is axially pulled away from the first shell, the second unlocking surface is contacted with the first unlocking surface located at the end surface of the elastic buckling portion, thereby forcing the elastic buckling portion to expand outwardly to unlock the clamping portion.

2. The optical fiber connector according to claim 1, wherein the stop structure comprises a first stop portion arranged on the second shell and a second stop portion arranged on the unlocking shell and matched with the first stop portion.

3. The optical fiber connector according to claim 2, wherein one side surface of the first stop portion close to the first shell is an inclined surface.

4. The optical fiber connector according to claim 3, wherein one side surface of the second stop portion close to the second shell is an inclined surface matched with the inclined surface of the first stop portion.

5. The optical fiber connector according to claim 1, wherein the second shell further comprises a second shell body, the elastic buckling portion is mounted on the second shell body, and the unlocking shell is movably limited on the elastic buckling portion through the stop structure.

6. The optical fiber connector according to claim 1, wherein the unlocking shell is further mounted on the second shell through an anti-rotation positioning structure.

7. The optical fiber connector according to claim 6, wherein the anti-rotation positioning structure comprises an anti-rotation positioning pin arranged at an end portion of the unlocking shell, and the second shell is provided with a positioning groove into which the anti-rotation positioning pin is inserted.

8. The optical fiber connector according to claim 1, wherein the first shell and the second shell are respectively provided with a position mark, and the first shell is inserted into the second shell when the two position marks are aligned.

9. The optical fiber connector according to claim 1, wherein the first shell is provided with a sealing ring, and the first shell is hermetically connected to the second shell through the sealing ring.

10. The optical fiber connector according to claim 1, wherein the first shell further comprises a locking groove arranged on one side of the clamping portion and matched with an end portion of the elastic buckling portion.

* * * * *